(12) United States Patent
Su et al.

(10) Patent No.: US 7,684,628 B2
(45) Date of Patent: Mar. 23, 2010

(54) SYSTEM AND METHOD FOR NON-ITERATIVE GLOBAL MOTION ESTIMATION

(75) Inventors: Yeping Su, Seattle, WA (US); Ming-Tin Sun, Kao-Hsiung (TW); Yuh-Feng Hsu, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 1239 days.

(21) Appl. No.: 10/916,599

(22) Filed: Aug. 12, 2004

(65) Prior Publication Data

US 2006/0034528 A1  Feb. 16, 2006

(51) Int. Cl.
*G06K 9/36* (2006.01)
(52) U.S. Cl. .................... 382/236; 375/240.16
(58) Field of Classification Search .... 375/240–240.29; 382/232–253
See application file for complete search history.

(56) References Cited

U.S. PATENT DOCUMENTS

| | | | |
|---|---|---|---|
| 5,430,480 A | | 7/1995 | Allen et al. |
| 5,575,286 A | * | 11/1996 | Weng et al. ............ 600/444 |
| 5,682,205 A | * | 10/1997 | Sezan et al. ............ 348/452 |
| 5,973,733 A | | 10/1999 | Gove |
| 6,160,917 A | * | 12/2000 | Sommer .................. 382/236 |
| 6,278,736 B1 | * | 8/2001 | De Haan et al. ....... 375/240.16 |
| 6,385,245 B1 | * | 5/2002 | De Haan et al. ....... 375/240.16 |
| 6,707,854 B1 | | 3/2004 | Bonnet et al. |
| 6,738,099 B2 | * | 5/2004 | Osberger ................ 348/699 |
| 7,075,988 B2 | * | 7/2006 | Lee et al. ............... 375/240.16 |
| 7,227,896 B2 | * | 6/2007 | Sun ....................... 375/240.16 |
| 2002/0118761 A1 | | 8/2002 | Lee |
| 2003/0072373 A1 | | 4/2003 | Sun |
| 2003/0086498 A1 | * | 5/2003 | Lee et al. ............... 375/240.16 |
| 2004/0027454 A1 | * | 2/2004 | Vella et al. ............. 348/155 |
| 2006/0023786 A1 | * | 2/2006 | Li et al. ................. 375/240.16 |
| 2006/0034528 A1 | * | 2/2006 | Su et al. ................ 382/236 |
| 2006/0062296 A1 | * | 3/2006 | Li et al. ................. 375/240.12 |
| 2006/0072663 A1 | * | 4/2006 | Li et al. ................. 375/240.16 |

OTHER PUBLICATIONS

"Vision Based Station Keeping and Docking for Floating Robots" Sjoerd Van der Zwaan Universidade Technica De Lisboa Chapter 2 (projective geometry and transformations) pp. 7-20 May 2001.*
"Real Time Motion analysis with linear programming" Ben-Erza et al. Computer vision and Image Understanding pp. 32-52. Copyright 2000.*

(Continued)

*Primary Examiner*—Bhavesh M Mehta
*Assistant Examiner*—Sean Motsinger
(74) *Attorney, Agent, or Firm*—Alston & Bird LLP (57) ABSTRACT

A fast non-iterative Global Motion Estimation (GME) algorithm is disclosed for estimating the perspective transform global motion parameters from the Motion Vectors (MV) obtained from the block matching process that includes grouping a plurality of motion vectors in the input video stream into a predetermined number of groups of motion vectors, calculating a set of global motion parameters from each of the predetermined groups of the motion vector, and processing the set of global motion parameters generated from the calculation to obtain a final estimation.

19 Claims, 4 Drawing Sheets

OTHER PUBLICATIONS

Stiller et al. "Estimating Motion in Image Sequences", IEEE Signal Processing Magazine, Jul. 1999, pp. 70-91.

Dufaux et al. "Efficient, Robust, and Fast Global Motion Estimation for Video Coding" IEEE Transactions on Image Processing, vol. 9. No. 3, Mar. 2000, pp. 497-501.

Jozawa et al. "Two-Stage Motion Compensation Using Adaptive Global MC and Local Affine MC", IEEE Transactions on Circuits and Systems for Video Technology, vol. 7, No. 1, Feb. 1997 ,75-85.

Su et al. "Robust Global Motion Estimation From Coarsley Sampled Motion Vector Fields", University of Washington.

Su et al. "Global Motion Estimation From Coarsley Sampled Motion Vector Field and the Applications", University of Washington.

MPEG-4 Video Verification Model Version 18.0, Jan. 2001.

W. H. Press et al, Numerical Recipes in C: The Art of Scientific Computing, Cambridge, U.K.: Cambridge Univ. Press, 1988, Chapter 2.6, p. 59-70.

Su et al., "A Non-iterative motion vector based Global motion estimation algorithm," *Multimedia and Expo, 2004 ICME '04, 2004 IEEE International Conference*, vol. 1, pp. 703-706, Jun. 30, 2004.

\* cited by examiner

SYSTEM AND METHOD FOR NON-ITERATIVE GLOBAL MOTION ESTIMATION

BACKGROUND

1. Field of the Invention

The present invention relates generally to methods and systems for estimating Global Motions (GMs) in a video sequence, and more particularly, to methods and systems for estimating and compensating for GMs in a video sequence through a novel non-iterative motion estimation.

2. Background of the Invention

Utilization of a video camera or a digital still camera (DSC) to record a scene is well known in the art. The scene recorded by the video camera is formed of a video sequence that comprises a number of individual images, or frames, taken at regular intervals. When the intervals are sufficiently small, displaying the successive frames adequately recreates the motion of the recorded scene.

In general, the motion in the video sequence, or the differences between successive frames, is due to movements of an object being recorded or the motion of the camera itself, resulting from adjustments by the user to the camera functionalities, such as zooming, involuntary movements, or jitters. The motions caused by camera movements result in Global Motions (GMs) in the video sequence, meaning the entire scene shifts and moves, as opposed to a local motion, such as a movement by an object being recorded, against a steady background. Some GMs such as jitters are generally unintended and undesired during a recordation process. A number of systems and methods have been proposed to estimate and compensate for GMs.

It is known in the art that GMs in a video sequence are often modeled by parametric transforms of 2D images. The process of estimating the transform parameters from images is known as Global Motion Estimation (GME). GME is an important tool widely used in computer vision, video processing, and other related fields. As an example, for MPEG-4 GME, global motions are described in a parametric form, with models ranging from a simple translational model with two parameters to a general perspective model with eight parameters. Among these models, the model with eight parameters is the most general in MPEG-4 GME. According to this model, the GM between a reference frame and a current frame can be represented by coordinates (x, y) that is calculated by the following equations:

$$x' = \frac{m_0 x + m_1 y + m_2}{m_6 x + m_7 y + 1},$$

$$y' = \frac{m_3 x + m_4 y + m_5}{m_6 x + m_7 y + 1}$$

GMs can only be calculated by finding all eight parameters, $m_0 \sim m_7$, of the frames. Many algorithms have been proposed for MPEG-4 GME, both in the pixel-domain and in the compressed-domain. Most of the algorithms dealing with the perspective model, however, are iterative because the perspective transform model is nonlinear with respect to the GM parameters. Although acceptable performance can be achieved through the iterative approach, the computational cost may be prohibitive for real-time encoding or for applications with limited computational power such as those in wireless devices.

Furthermore, the conventional GME algorithm is considered as the most time consuming and cost ineffective operation in modern MPEG-4 Advanced Simple Profile (ASP) video coding. As computational cost is the major concern for some applications involving GME, it is desirable to design an algorithm with less computational complexities.

BRIEF SUMMARY OF THE INVENTION

In accordance with the present invention, there is provided a non-iterative method for estimating global motions between a plurality of image frames in an input video stream that includes grouping a plurality of motion vectors in the input video stream into a predetermined number of groups of motion vectors, calculating a set of global motion parameters from each of the predetermined groups of the motion vector, and processing the set of global motion parameters generated from the calculation to obtain a final estimation.

In one embodiment, the step of grouping the motion vectors is based on a fixed spatial distance among the motion vectors within each of the predetermined number of groups.

Also in accordance with the present invention, there is provided a method for estimating global motions between a reference image frame and a current image frame that includes employing a perspective model with eight global motion parameters $(m_0\text{-}m_7)$, wherein $$x' = f_x(x, y \mid m) = \frac{m_0 x + m_1 y + m_2}{m_6 x + m_7 y + 1}$$

$$y' = f_y(x, y \mid m) = \frac{m_3 x + m_4 y + m_5}{m_6 x + m_7 y + 1}$$

where (x,y) and (x',y') are the coordinates in the current and the reference images frames, respectively, with the set of eight global motion parameters $m = [m_0, \ldots, m_7]$, and calculating the set of eight global motion parameter m using algebraic distance as below:

$$\chi^2 = \sum_{i=0}^{N-1} \left\| \begin{bmatrix} x'_i \cdot (m_6 x_i + m_7 y_i + 1) - (m_0 x_i + m_1 y_i + m_2) \\ y'_i \cdot (m_6 x_i + m_7 y_i + 1) - (m_3 x_i + m_4 y_i + m_5) \end{bmatrix} \right\|^2 =$$

$$\sum_{i=0}^{N-1} \left\| \begin{bmatrix} -x_i \cdot m_0 - y_i \cdot m_1 - m_2 + x'_i x_i \cdot m_6 + x'_i y_i \cdot m_7 + x'_i \\ -x_i \cdot m_3 - y_i \cdot m_4 - m_5 + y'_i x_i \cdot m_6 + y'_i y_i \cdot m_7 + y'_i \end{bmatrix} \right\|^2$$

where $x'_i = MV_{xi} + x_i$ and $y'_i = MV_{yi} + y_i$.

In one embodiment, the algebraic distance equation may be solved with an over-determined linear system as follows:

$$\begin{pmatrix} x_0 & y_0 & 1 & 0 & 0 & 0 & -x_0 x'_0 & -y_0 x'_0 \\ 0 & 0 & 0 & x_0 & y_0 & 1 & -x_0 y'_0 & -y_0 y'_0 \\ \vdots & \vdots & \vdots & \vdots & \vdots & \vdots & \vdots & \vdots \\ x_{N-1} & y_{N-1} & 1 & 0 & 0 & 0 & -x_{N-1} x'_{N-1} & -y_{N-1} x'_{N-1} \\ 0 & 0 & 0 & x_{N-1} & y_{N-1} x & 1 & -x_{N-1} y'_{N-1} & -y_{N-1} y'_{N-1} \end{pmatrix} \begin{pmatrix} m_0 \\ m_1 \\ m_2 \\ m_3 \\ m_4 \\ m_5 \\ m_6 \\ m_7 \end{pmatrix} =$$

$$\begin{pmatrix} x'_0 \\ y'_0 \\ \vdots \\ x'_{N-1} \\ y'_{N-1} \end{pmatrix}$$

In accordance with the present invention, there is additionally provided a non-iterative method for estimating global motions between a plurality of image frames in an input video stream that includes grouping a plurality of motion vectors in the input video stream into a predetermined number of groups of motion vectors, calculating a set of global motion parameters from each of the predetermined groups of the motion vector having a plurality of global motion parameters, and processing the set of global motion parameters generated from the calculation to obtain a final estimation. The step of calculating a set of global motion parameters further includes calculating the plurality of global motion parameters using algebraic distance, and calculating the algebraic distance using an over-determined linear system.

In accordance with the present invention, there is further provided a system for estimating global motions between image frames of an input video stream that includes a grouping device for grouping a plurality of motion vectors contained in the input video stream to obtain a predetermined groups of motion vectors, a calculation device for calculating a global motion estimation from each of the predetermined groups of motion vectors to obtain a set of global motion parameters $\{m_j\}_{j=1:J}$, with each global motion estimation $m_j$ comprising eight global motion parameters ($m_0, \ldots; m_7$), and a post-processing device for obtaining a final estimation from the set of global motion parameters.

In one embodiment, the system further includes means for calculating a histogram of the global motion parameter $\{m_j\}_{j=1:J}$ with four bins in each of eight dimensions, means for choosing a bin from the four bins that includes a largest amount of $m_j$, and means for averaging over the $m_j$ of the chosen bin to obtain the final estimate.

DETAILED DESCRIPTION OF THE INVENTION

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

A fast non-iterative Global Motion Estimation (GME) algorithm is disclosed for estimating the perspective transform global motion parameters from the Motion Vectors (MV) obtained from the block matching process. The present invention employs a non-iterative motion vector based GME algorithm to estimate the eight GM parameters of the most general model as described above. The algorithm of the present invention utilizes motion vectors (MVs) in an input video stream to estimate the GM parameters. The MV-based algorithm of the present invention is able to reduce the computational complexity of global motion estimation with minimum quality loss. In addition, the algorithm of the present invention may be implemented in a conventional MPEG-4 encoder after a block-based motion estimation (BME) process. Specifically, the MV-based algorithm of the present invention is linear and non-iterative, and therefore can estimate the perspective GM parameters efficiently and robustly.

In accordance with one embodiment of the present invention, the MV-based GME algorithm is to estimate GM parameters with the general perspective model from a sampled MV field. A BME is first performed on parts of the image frame to estimate the block MVs, and then the block MVs are used to estimate the GM parameters. One embodiment of the present invention provides a method for estimating GMs between image frames in an input video stream. According to this embodiment, a plurality of MVs included in the input video stream is grouped into J groups of MVs. The method then calculates a GME for each of the groups of the motion vector to obtain J sets of GME. The J sets of GME are further processed to obtain a final estimation. The GMs may be estimated using algebraic distance and an over-determined system.

The present invention further provides a system for estimating GMs between image frames in an input video stream. The system includes a grouping device for grouping a plurality of MVs contained in the input video stream to obtain J groups of MVs, a calculation device for calculating a GME from each of the J groups of MVs to obtain a set of GME $\{m_j\}_{j=1:J}$, with each GME $m_j$ comprising eight GM parameters ($m_0, \ldots; m_7$), and a post-processing device for obtaining a final estimation from the set of GME.

In accordance with the present invention, an image frame recorded by a digital camera is first divided into a number of blocks and each block includes a matrix of pixels. The block motion estimation of each of the MV blocks is calculated first and resulted motion vectors are processed to obtain a final estimate. Unlike the pixel-by-pixel estimation used in the conventional method, which is iterative and therefore time-consuming, the present invention performs GMEs for each of the MV blocks, thus reducing the number of calculation steps and computational complexity.

For example, consider a point on an object moving in the 3D space. Its position can be expressed in the 3D coordinates as $x=(X,Y,Z)^T \in R^3$, and $(X(t),t)$ defines its moving trajectory in the 3D space over time. Image acquisition systems project the 3D world onto a 2D image plane and sample them at a usually uniform grid $x=(x,y)^T \in R^2$. Upon this projection, a 2D motion trajectory (x(t),t) in obtained. In general, a MV field is a vector-valued function of motion trajectories on continuous spatial coordinates. In practical applications, this function is commonly described in a parametric form as transformations with sets of parameters or the motion trajectories of some reference points.

Various 2-D parametric models have been defined in MPEG-4 standards and the eight-parameter perspective model is the most general one, in which the transformation is defined as $$x' = f_x(x, y \mid m) = \frac{m_0 x + m_1 y + m_2}{m_6 x + m_7 y + 1} \quad (1)$$

$$y' = f_y(x, y \mid m) = \frac{m_3 x + m_4 y + m_5}{m_6 x + m_7 y + 1}$$

where (x,y) and (x',y') are the coordinates in the current and the reference images respectively, with the set of GM parameters $m=[m_0, \ldots, m_7]$. An embodiment of the present invention focuses on the perspective transforms as the most general GM model defined in MPEG-4.

Figure 1:
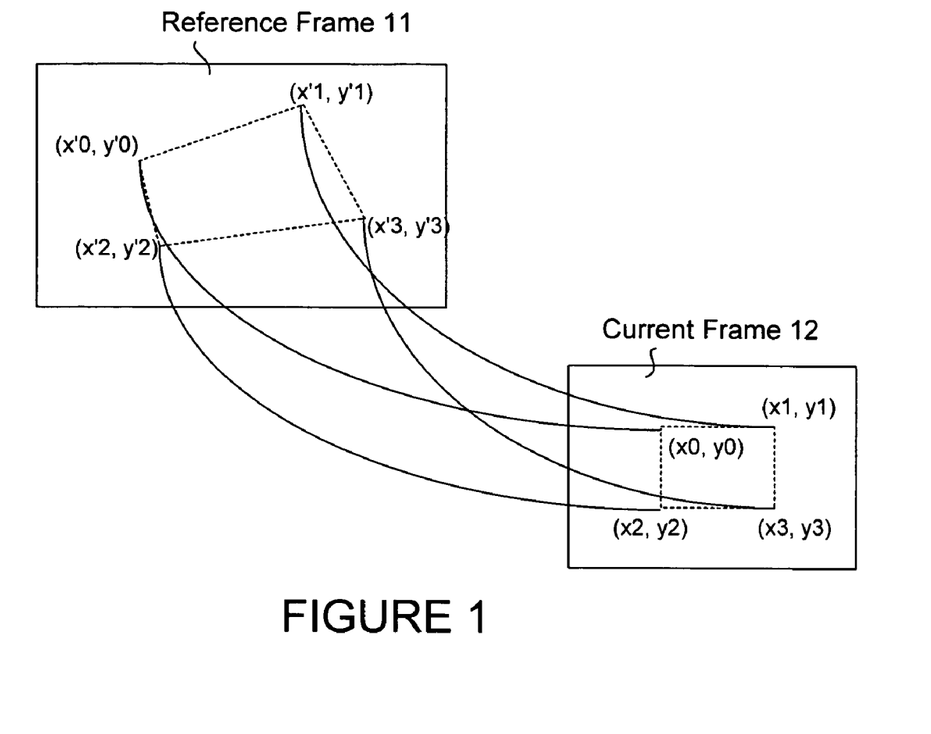
FIG. 1 is a diagram showing GM correspondences between current and reference image frames.

FIG. 1 shows the concept of global motion compensation with the perspective model, where the correspondence between a current frame 12 and a reference frame 11 are illustrated.

In an embodiment of the present invention, each of image frames taken by a camera is divided into a number of MV blocks by an exemplary conventional GME method. In applications such as MPEG-2 to MPEG-4 ASP transcoding, the MVs from the block-matching are readily available. Considering MVs from BME as noisy samples of the motion vector field, the goal of a practical GME algorithm is to achieve accurate estimation of the global motion parameters robustly and efficiently.

A difficulty of the GME method using MVs, however, is the estimation of the GM parameter m from the MV set, which is available from the compressed video bit-stream and defined as $\{(x_i,y_i),(MVx_i,MVy_i)\}_{i=0:N-1}$, where $(MVx_i,MVy_i)$ denotes the i-th motion vector located at $(x_i,y_i)$ in the current picture, with N denoting the total number of MVs. Applying the Euclidian distance calculations, the parameters can be calculated by the following nonlinear least-square (LS) problem because the perspective model is nonlinear.

$$m = \underset{m}{\operatorname{argmin}} \left( \sum_{i=0}^{N-1} \|r_i\|^2 \right) \underset{m}{\operatorname{argmin}} \left( \sum_{i=0}^{N-1} \left\| \begin{bmatrix} MVx_i - f_x(x_i, y_i \mid m) + x_i \\ MVy_i - f_y(x_i, y_i \mid m) + y_i \end{bmatrix} \right\|^2 \right) \quad (2)$$

To solve this nonlinear LS problem, however, an iterative optimization procedures need to be employed. As computational burden of the iterative procedures will increase the cost of the GME module, these procedures might be cost-prohibitive for many applications.

Instead, in accordance with an embodiment of the present invention, an algebraic distance is used in the target function such that the LS calculation becomes linear as shown by the following formula:

$$\chi^2 = \sum_{i=0}^{N-1} \left\| \begin{bmatrix} x'_i \cdot (m_6 x_i + m_7 y_i + 1) - (m_0 x_i + m_1 y_i + m_2) \\ y'_i \cdot (m_6 x_i + m_7 y_i + 1) - (m_3 x_i + m_4 y_i + m_5) \end{bmatrix} \right\|^2 = \quad (3)$$

$$\sum_{i=0}^{N-1} \left\| \begin{bmatrix} -x_i \cdot m_0 - y_i \cdot m_1 - m_2 + x'_i x_i \cdot m_6 + x'_i y_i \cdot m_7 + x'_i \\ -x_i \cdot m_3 - y_i \cdot m_4 - m_5 + y'_i x_i \cdot m_6 + y'_i y_i \cdot m_7 + y'_i \end{bmatrix} \right\|^2$$

where $x_i'=MV_{x_i}+x_i$ and $y_i'=MV_{y_i}+y_i$. It is known in the art that the LS formulation in (3) is prone to outliers, largely due to the inaccuracies in the BME processes and local motions. Many robust regression algorithms have been established to solve the outliers problem, such as using M-estimators. The preferred embodiment of the present invention avoids the use of iterative algorithms, but still be able to handle the outliers. Accordingly, the equation in (3) may be solved by employing the following over-determined linear system:

$$\begin{pmatrix} x_0 & y_0 & 1 & 0 & 0 & 0 & -x_0 x'_0 & -y_0 x'_0 \\ 0 & 0 & 0 & x_0 & y_0 & 1 & -x_0 y'_0 & -y_0 y'_0 \\ \vdots & \vdots & \vdots & \vdots & \vdots & \vdots & \vdots & \vdots \\ x_{N-1} & y_{N-1} & 1 & 0 & 0 & 0 & -x_{N-1} x'_{N-1} & -y_{N-1} x'_{N-1} \\ 0 & 0 & 0 & x_{N-1} & y_{N-1} x & 1 & -x_{N-1} y'_{N-1} & -y_{N-1} y'_{N-1} \end{pmatrix} \begin{pmatrix} m_0 \\ m_1 \\ m_2 \\ m_3 \\ m_4 \\ m_5 \\ m_6 \\ m_7 \end{pmatrix} = \quad (4)$$

$$\begin{pmatrix} x'_0 \\ y'_0 \\ \vdots \\ x'_{N-1} \\ y'_{N-1} \end{pmatrix}$$

or, $A_{2N \times 8} m_{8 \times 1} = b_{2N \times 1}$, which is equivalent to $A^T A m = A^T b$. This matrix equation can be solved by using standard matrix inversion routines, or more robustly, using pseudo-inverse via Singular Value Decomposition (SVD).

By using the algebraic distance in the target function, the estimation problem of the prior art is drastically simplified, which makes the non-iterative approach feasible. Although the algebraic distance may result in some accuracy deviation, the performance degradation is insignificant as shown in the simulation results shown in FIGS. 5 and 6, which will be described in detailed later.

Figure 2:
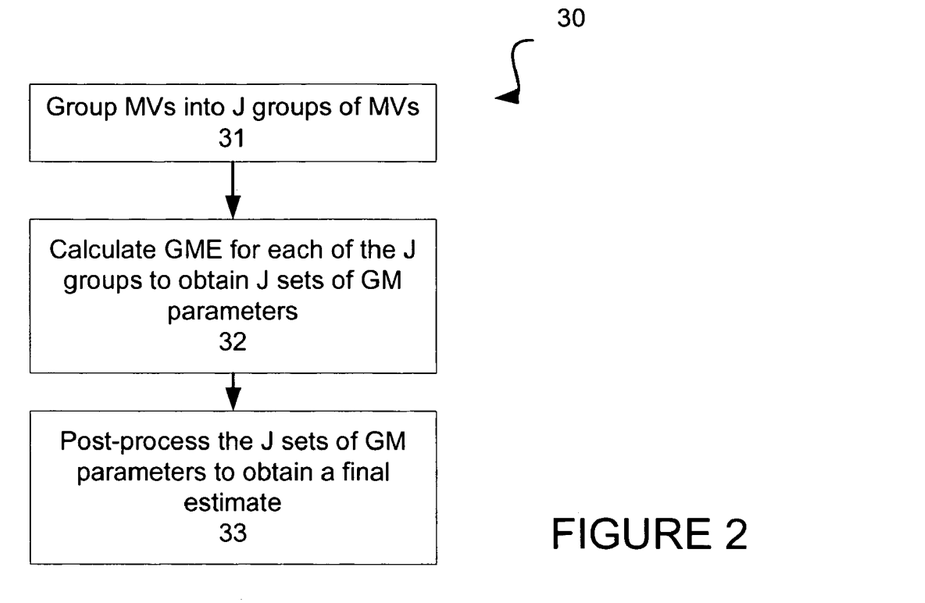
FIG. 2 is a flow chart of a method of non-iterative MV-based GME in accordance with one embodiment of the present invention.
Figure 4:
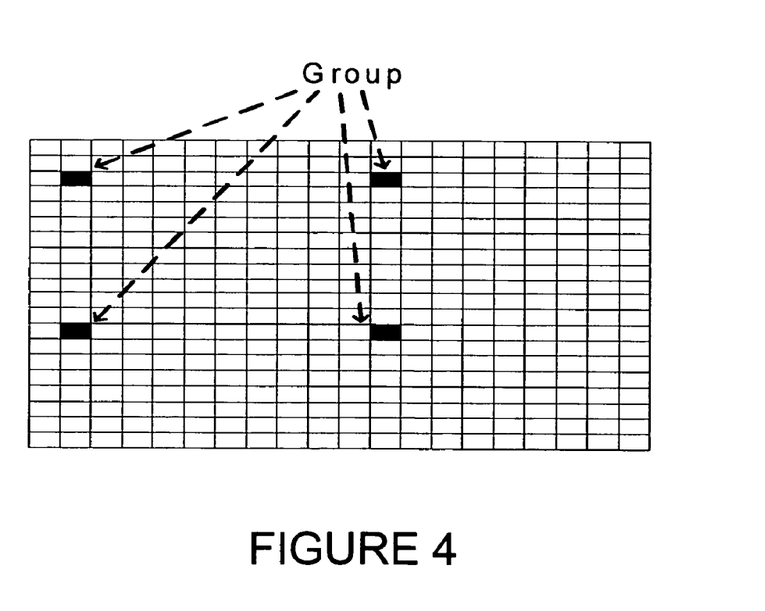
FIG. 4 is a schematic diagram showing MV groupings in accordance with one embodiment of the present invention.

FIG. 2 illustrates a flow chart of a non-iterative GME algorithm in accordance with one embodiment of the present invention. Referring to FIG. 2, at step 31, the input MV blocks of each image frame is grouped into J groups of MVs blocks. The grouping of the MV blocks is illustrated in FIG. 4, which will be described later. In accordance with one embodiment, each group of MVs includes four or more MVs.

At step 32, the GME in each group is solved by through the equation $A^T A m = A^T b$ as shown by equation (4) described above using SVD-based pseudo-inverse. In an exemplary embodiment, A is an 8×8 matrix. As a result, a group of GM parameters: $\{m_j\}_{j=1:J}$ is obtained.

Generally, the further MVs are separated within a group, the better the discriminative power the MVs possess for the estimation of global motion parameters. This is illustrated as how badly $A^T A$ is ill-conditioned for inversion, that is, the larger spatial distance, the smaller the condition number of A, which is the same as the condition number of $A^TA$. Specifically, in SVD, conditional number is defined as the ratio of the largest and smallest singular values of a matrix. When the condition number is sufficiently large, the matrix is near singular and the inverse of the matrix becomes unreliable.

The method of the present invention can pick any four motion vectors to generate a GM parameter. For example, four motion vectors may be picked near the four corners. However, to prevent the situation that a particular choice of four motion vectors may happen to be corrupted by local motions, an exemplary preferred embodiment of the present invention groups all the motion vectors in groups of four or more motion vectors, and use them to achieve a robust estimation. The grouping of the input MVs is by a fixed spatial aperture/pattern, as shown in FIG. 4. By fixing the distance among the MVs within a group, each group of MVs has the same and maximum allowable spatial diversity.

Referring again to FIG. 2, at step 33, a final estimation is calculated from the group of GM parameters: $\{m_j\}_{j=1:J}$ obtained from step 32. In accordance with an embodiment of the present invention, the final estimation is performed by a histogram-based post-processing approach. In other words, the histogram of $\{m_j\}_{j=1:J}$ is calculated with 4 bins in each of 8 dimensions, and the bin with the largest amount of $m_j$ in it is chosen. The number of bins is chosen according to the number of groups. The simulations shown and discussed herein are based on 4-bin calculations for each of 8 dimensions. The final estimate is obtained by averaging all the $m_j$s within the chosen bin. A more accurate result may be obtained by creating more bins. However, as shown in the simulation results, four bins already provide exceptionally accurate results.

By using the MV grouping, the present invention divides the input MV data sets into small non-overlapping subsets, and gets one GM estimation from each subset. Some resulted $m_j$s will be corrupted by outliers, but the majority will be around the true global motion value. So a histogram-based approach in the above step is able to eliminate the effects of outliers and provide a robust estimation.

Figure 3:
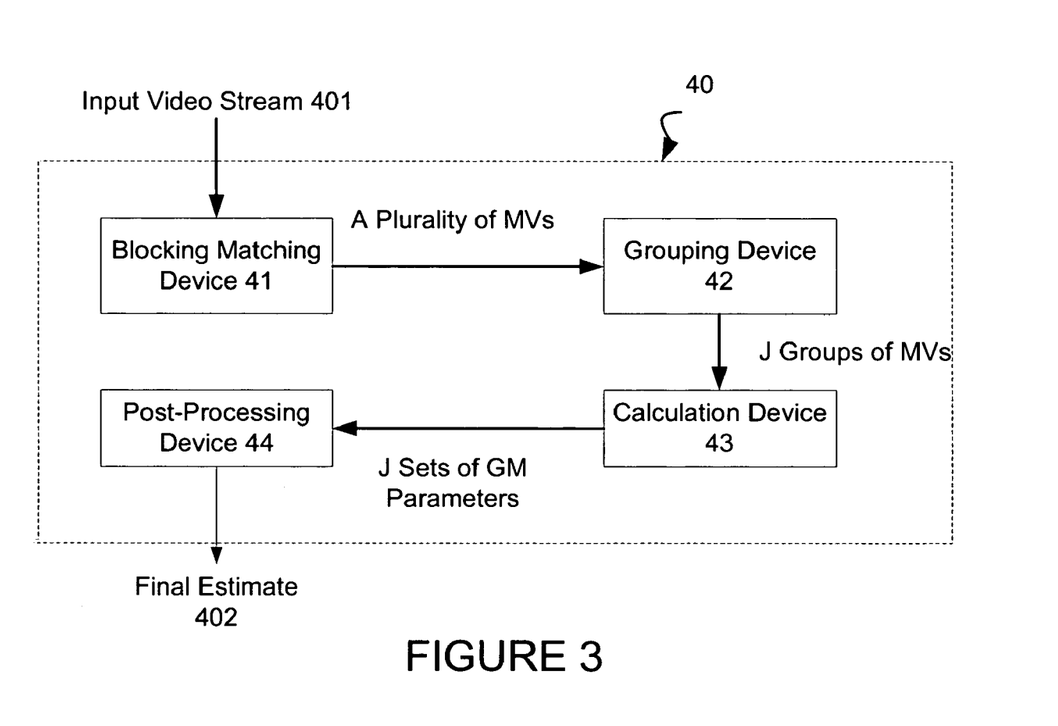
FIG. 3 is a block diagram of a system for obtaining non-iterative MV-based GME in accordance with one embodiment of the present invention.

The above-described method of the present invention may be implemented in a system depicted in FIG. 3. Referring to FIG. 3, system 40 includes a block-based matching device 41 for dividing an input video stream 401 into a plurality of MVs. The plurality of MVs are next grouped by grouping device 42 to result in J groups of MVs. As described above, each of the J groups includes four or more MVs, and is grouped based on a fixed spatial aperture/pattern such that the distance among the MVs within each group is fixed.

System 40 further includes calculation device 43 for calculating GM of each of the J groups of MVs. The calculation follows the perspective model with eight GM parameters ($m_0$-$m_7$) as described with reference to equations (1)-(4). After the calculation, J sets of GM parameters $\{m_j\}_{j=1:J}$ are obtained.

The J sets of GM parameters $\{m_j\}_{j=1:J}$ are then processed in post-processing device 44. In an exemplary embodiment of the present invention, post-processing device 44 first calculates a histogram from the J sets of GM parameter $\{m_j\}_{j=1:J}$ with 4 bins in each of eight dimensions, chooses a bin with a largest amount of $m_j$ in it, and averages the GM parameters ($m_0$-$m_j$) of the chosen $m_j$ to obtain a final estimation 402. Final estimation 402 is then output to a processor (not shown) for further processing.

Figure 5A:
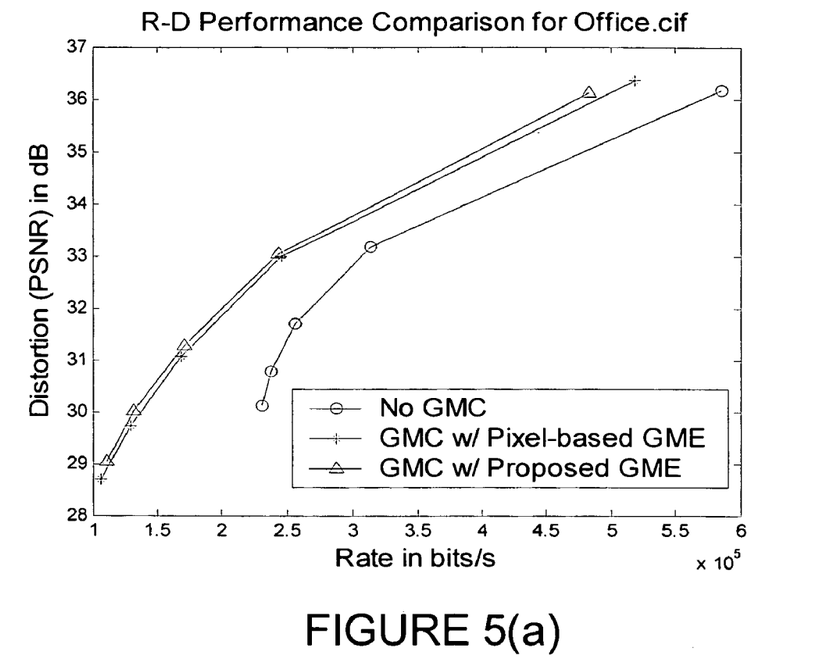
FIGS. 5(a) and 5(b) are charts comparing the rate-distortion (R-D) performance of a conventional pixel-GME algorithm and the MV-GME algorithm consistent with the present invention.
Figure 5B:
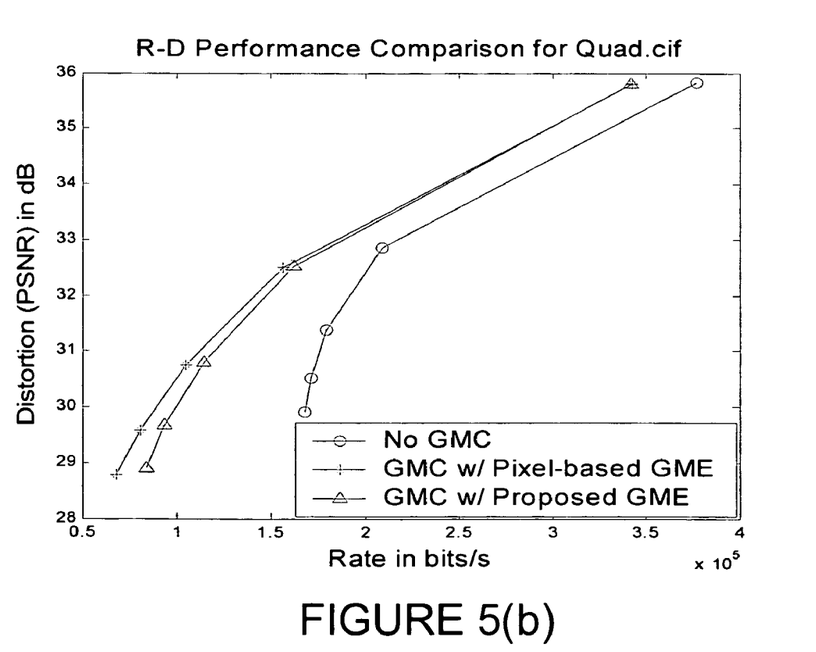
Figure 6:
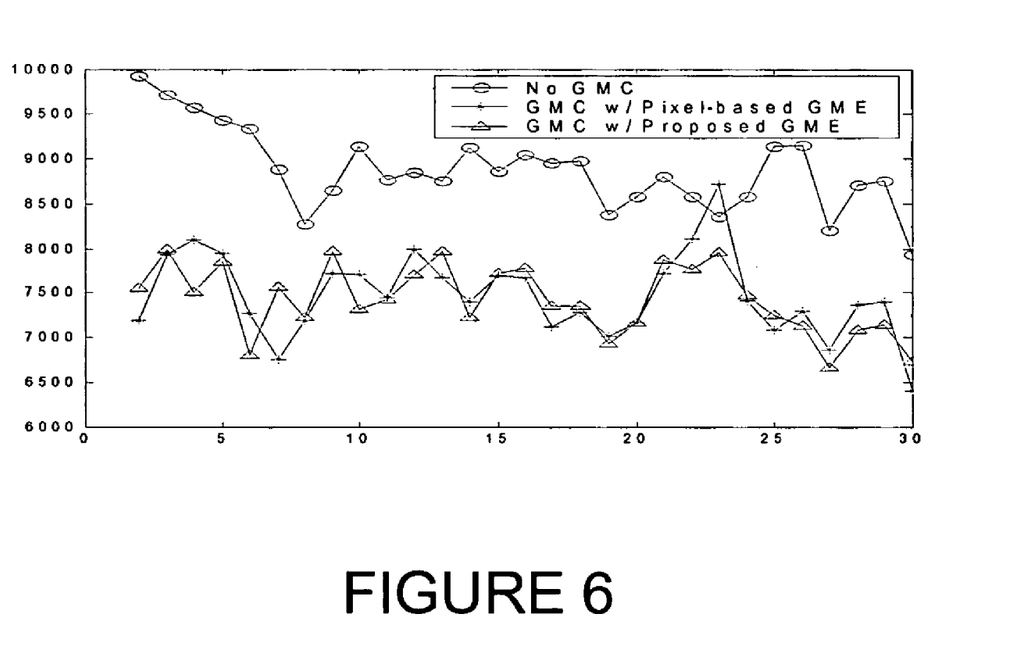
FIG. 6 is a chart comparing the number of bits used by simulation between the conventional pixel-GME algorithm and the MV-GME algorithm consistent with the present invention.

FIGS. 5(a), 5(b) and 6 illustrate simulation results of the method and system of the present invention in comparison with the conventional methods and systems. The GME algorithm of the present invention is tested in the MPEG-4 GMC encoding as a fast estimation of the GM parameters in place of the default pixel-domain iterative GME in the reference software Momusys. The GME algorithm of the present invention is denoted as MV-GME, in which integer-pixel MVs from the 16-by-16 Macroblock-based full-search BME are fed to the fast GME routine.

Several CIF-sized video sequences are used in the simulations, which contain typical camera zooming and panning motions. The Rate-Distortion performance comparison of the Pixel-GME and the MV-GME algorithms are shown in FIGS. 5(a) and 5(b). Clearly, the MV-GME algorithm performs very close to the Pixel-GME method in coding efficiency. FIG. 6 shows the comparison of bits used when coding the first 30 frames of the MIT sequence, with PSNR≈30 dB using fixed QP.

In terms of the computational cost, the MV-GME method only requires a small fraction of the computational requirements of the Pixel-GME since only one MV out of a block of pixels is involved in the estimation and the estimation is non-iterative. Average computations per call of the MV-GME and Pixel-GME routines in terms of runtime are compared in Table 1, which shows the significant increase in speed in the system and method of the present invention. The computation reduction is calculated as the runtime ratio of two GME algorithms: $T_{MVGME}/T_{PixelGME}$, where T denotes the total runtime of the GME subroutine, and the experiments are conducted on a PC with 2 GHz P4 CPU.

TABLE 1

Computational Comparison

| Sequence | Resolution #frames | Computation Reduction |
|---|---|---|
| MIT | CIF/59 | 0.5% |
| Bicycle | CIF/150 | 0.37% |
| Pigeon | CIF/300 | 0.68% |
| Office | CIF/300 | 0.98% |
| Quad | CIF/300 | 1.04% |

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A non-iterative method for estimating global motions between a plurality of image frames in an input video stream, comprising:
   grouping a plurality of motion vectors in the input video stream into a predetermined number of groups of motion vectors;
   calculating a set of global motion parameters from each of the predetermined groups of the motion vector; wherein the calculating results in a group of global motion parameters $\{m_j\}_{j=1:J}$, and
   processing the set of global motion parameters generated from the calculation to obtain a final estimation, wherein the processing further comprises:
   calculating a histogram of the group of global motion parameters $\{m_j\}_{j=1:J}$ with a plurality of bins;
   choosing a bin from the plurality of bins that includes a largest amount of $m_j$; and
   averaging over the $m_j$ of the chosen bin to obtain the final estimate.

2. The method of claim 1, wherein each of the predetermined groups includes N motion vectors, N being an integer having a value of at least 4.

3. The method of claim 1, wherein the plurality of motion vectors are obtained through a block-based motion estimation method on the input video stream.

4. The method of claim 1, wherein the step of grouping the motion vectors is based on a fixed spatial distance among the motion vectors within each of the predetermined number of groups.

5. The method of claim 1, wherein calculating the global motion estimates is based on a perspective model with eight global motion parameters ($m_0$-$m_7$) as below:

$$x' = f_x(x, y \mid m) = \frac{m_0 x + m_1 y + m_2}{m_6 x + m_7 y + 1} \quad (1)$$

$$y' = f_y(x, y \mid m) = \frac{m_3 x + m_4 y + m_5}{m_6 x + m_7 y + 1}$$

where (x, y) and (x', y') are the coordinates in the current and the reference image frames, respectively, with the eight global motion parameters m=[$m_0$, . . . , $m_7$],
wherein the eight global motion parameters m is calculated using algebraic distance:

$$\chi^2 = \sum_{i=0}^{N-1} \left\| \begin{bmatrix} x'_i \cdot (m_6 x_i + m_7 y_i + 1) - (m_0 x_i + m_1 y_i + m_2) \\ y'_i \cdot (m_6 x_i + m_7 y_i + 1) - (m_3 x_i + m_4 y_i + m_5) \end{bmatrix} \right\|^2 =$$

$$\sum_{i=0}^{N-1} \left\| \begin{bmatrix} -x_i \cdot m_0 - y_i \cdot m_1 - m_2 + x'_i x_i \cdot m_6 + x'_i y_i \cdot m_7 + x'_i \\ -x_i \cdot m_3 - y_i \cdot m_4 - m_5 + y'_i x_i \cdot m_6 + y'_i y_i \cdot m_7 + y'_i \end{bmatrix} \right\|^2$$

where $x'_i = MV_{xi} + x_i$ and $y'_i = MV_{yi} + y_i$.

where $x_i'=MV_{x_i}+x_i$ and $y_i'=MV_{y_i}+y_i$, and $(MV_{x_i}, MV_{y_i})$ is an i-th motion vector located at $(x_i, y_i)$ in the current image frame.

6. The method of claim 5, wherein the algebraic distance is solvable by an over-determined linear system in a matrix equation as given below:

$$\begin{pmatrix} x_0 & y_0 & 1 & 0 & 0 & 0 & -x_0 x'_0 & -y_0 x'_0 \\ 0 & 0 & 0 & x_0 & y_0 & 1 & -x_0 y'_0 & -y_0 y'_0 \\ \vdots & \vdots & \vdots & \vdots & \vdots & \vdots & \vdots & \vdots \\ x_{N-1} & y_{N-1} & 1 & 0 & 0 & 0 & -x_{N-1} x'_{N-1} & -y_{N-1} x'_{N-1} \\ 0 & 0 & 0 & x_{N-1} & y_{N-1} x & 1 & -x_{N-1} y'_{N-1} & -y_{N-1} y'_{N-1} \end{pmatrix} \begin{pmatrix} m_0 \\ m_1 \\ m_2 \\ m_3 \\ m_4 \\ m_5 \\ m_6 \\ m_7 \end{pmatrix} = \quad (2)$$

$$\begin{pmatrix} x'_0 \\ y'_0 \\ \vdots \\ x'_{N-1} \\ y'_{N-1} \end{pmatrix}$$

7. The method of claim 6, wherein the matrix equation (3) is solvable by using at least one of standard matrix inversion routines and pseudo-inverse via Singular Value Decomposition.

8. The method of claim 5, wherein the processing step comprises:
   calculating the histogram of the global motion parameters $\{m_j\}_{j=1:J}$ with four bins in each of eight dimensions;
   choosing the bin from the four bins that includes a largest amount of $m_j$; and
   averaging over the $m_j$ of the chosen bin to obtain the final estimate.

9. A non-iterative method for estimating global motions between a reference image frame and a current image frame, comprising:
   employing a perspective model with eight global motion parameters (m0-m7), wherein $$x' = f_x(x, y \mid m) = \frac{m_0 x + m_1 y + m_2}{m_6 x + m_7 y + 1} \quad (1)$$

$$y' = f_y(x, y \mid m) = \frac{m_3 x + m_4 y + m_5}{m_6 x + m_7 y + 1}$$

where (x, y) and (x', y') are the coordinates in the current and the reference image frames, respectively, with the set of eight global motion parameters m=[$m_0$, . . . , $m_7$];
calculating the set of eight global motion parameters m using algebraic distance as below:

$$\chi^2 = \sum_{i=0}^{N-1} \left\| \begin{bmatrix} x'_i \cdot (m_6 x_i + m_7 y_i + 1) - (m_0 x_i + m_1 y_i + m_2) \\ y'_i \cdot (m_6 x_i + m_7 y_i + 1) - (m_3 x_i + m_4 y_i + m_5) \end{bmatrix} \right\|^2 = \quad (2)$$

$$\sum_{i=0}^{N-1} \left\| \begin{bmatrix} -x_i \cdot m_0 - y_i \cdot m_1 - m_2 + x'_i x_i \cdot m_6 + x'_i y_i \cdot m_7 + x'_i \\ -x_i \cdot m_3 - y_i \cdot m_4 - m_5 + y'_i x_i \cdot m_6 + y'_i y_i \cdot m_7 + y'_i \end{bmatrix} \right\|^2$$

where $x_i'=MV_{x_i}+x_i$ and $y_i'=MV_{y_i}+y_1$, and $(MV_{x_i}, MV_{y_i})$ is an i-th motion vector located at $(x_1, y_1)$ in the current image frame; and
processing the set of eight global motion parameters to obtain a final estimation, wherein the processing further comprises:
   calculating a histogram of the set of eight global motion parameters with a plurality of bins;

choosing a bin from the plurality of bins that includes a largest amount of $m_j$; and averaging over the $m_j$ of the chosen bin to obtain the final estimate.

10. The method of claim 9, wherein the algebraic distance equation (2) is solvable by an over-determined linear system as follows:

$$\begin{pmatrix} x_0 & y_0 & 1 & 0 & 0 & 0 & -x_0 x'_0 & -y_0 x'_0 \\ 0 & 0 & 0 & x_0 & y_0 & 1 & -x_0 y'_0 & -y_0 y'_0 \\ \vdots & \vdots & \vdots & \vdots & \vdots & \vdots & \vdots & \vdots \\ x_{N-1} & y_{N-1} & 1 & 0 & 0 & 0 & -x_{N-1} x'_{N-1} & -y_{N-1} x'_{N-1} \\ 0 & 0 & 0 & x_{N-1} & y_{N-1} x & 1 & -x_{N-1} y'_{N-1} & -y_{N-1} y'_{N-1} \end{pmatrix} \begin{pmatrix} m_0 \\ m_1 \\ m_2 \\ m_3 \\ m_4 \\ m_5 \\ m_6 \\ m_7 \end{pmatrix} = \quad (4)$$

$$\begin{pmatrix} x'_0 \\ y'_0 \\ \vdots \\ x'_{N-1} \\ y'_{N-1} \end{pmatrix}$$

wherein the over-determined linear system is represented as $A_{2N \times 8} m_{8 \times 1} = b_{2N \times 1}$, which is equivalent to $A^T A m = A^T b$.

11. A non-iterative method for estimating global motions between a plurality of image frames in an input video stream, comprising:

grouping a plurality of motion vectors in the input video stream into a predetermined number of groups of motion vectors;

calculating a set of global motion parameters from each of the predetermined groups of the motion vector having a plurality of global motion parameters, including
calculating the plurality of global motion parameters using algebraic distance, and
calculating the algebraic distance using an over-determined linear system; and processing the set of global motion parameters generated from the calculation to obtain a final estimation, wherein the processing further comprises calculating a histogram of the set of global motion parameters.

12. A system for estimating global motions between image frames of an input video stream, comprising:

a grouping device for grouping a plurality of motion vectors contained in the input video stream to obtain a predetermined groups of motion vectors;

a calculation device for calculating a global motion estimation from each of the predetermined groups of motion vectors to obtain a set of global motion parameters $\{m_j\}_{j=1:J}$, with each global motion estimation $m_j$ comprising a plurality of global motion parameters; and a post-processing device for obtaining a final estimation from the set of global motion parameters $\{m_j\}_{j=1:J}$, wherein the post-processing device further comprises:
means for calculating a histogram of the set of global motion parameters $\{m_j\}_{j=1:J}$ with a plurality of bins;
means for choosing a bin from the plurality of bins that includes a largest amount of $m_j$; and
means for averaging over the $m_j$ of the chosen bin to obtain the final estimate.

13. The system of claim 12, wherein each of the predetermined groups of motion vectors comprises N motion vectors, wherein N is an integer of at least 4.

14. The system of claim 12, wherein the plurality of motion vectors are obtained using block-based motion estimation method on the input video stream.

15. The system of claim 12, wherein the grouping is based on a fixed spatial distance among the motion vectors within each group.

16. The system of claim 12, wherein the global motion estimates are based on a perspective model with eight global motion parameters ($m_0$-$m_7$) as below:

$$x' = f_x(x, y \mid m) = \frac{m_0 x + m_1 y + m_2}{m_6 x + m_7 y + 1} \quad (1)$$

$$y' = f_y(x, y \mid m) = \frac{m_3 x + m_4 y + m_5}{m_6 x + m_7 y + 1}$$

where (x, y) and (x', y') are the coordinates in the current and the reference images frames, respectively, with the set of eight global motion parameters $m = [m_0, \ldots, m_7]$.

17. The system of claim 16, wherein the set of eight global motion parameters m is calculated using algebraic distance:

$$\chi^2 = \sum_{i=0}^{N-1} \left\| \begin{bmatrix} x'_i \cdot (m_6 x_i + m_7 y_i + 1) - (m_0 x_i + m_1 y_i + m_2) \\ y'_i \cdot (m_6 x_i + m_7 y_i + 1) - (m_3 x_i + m_4 y_i + m_5) \end{bmatrix} \right\|^2 = \quad (2)$$

$$\sum_{i=0}^{N-1} \left\| \begin{bmatrix} -x_i \cdot m_0 - y_i \cdot m_1 - m_2 + x'_i x_i \cdot m_6 + x'_i y_i \cdot m_7 + x'_i \\ -x_i \cdot m_3 - y_i \cdot m_4 - m_5 + y'_i x_i \cdot m_6 + y'_i y_i \cdot m_7 + y'_i \end{bmatrix} \right\|^2$$

where $x_i' = MV_{x_i} + x_i$ and $y_i' = MV_{y_i} + y_i$, and ($MV_{x_i}$, $MV_{y_i}$) is an i-th motion vector located at ($x_i$, $y_i$) in the current image frame.

18. The system of claim 17, wherein the equation (2) is solvable using an over-determined linear system as below:

$$\begin{pmatrix} x_0 & y_0 & 1 & 0 & 0 & 0 & -x_0 x'_0 & -y_0 x'_0 \\ 0 & 0 & 0 & x_0 & y_0 & 1 & -x_0 y'_0 & -y_0 y'_0 \\ \vdots & \vdots & \vdots & \vdots & \vdots & \vdots & \vdots & \vdots \\ x_{N-1} & y_{N-1} & 1 & 0 & 0 & 0 & -x_{N-1} x'_{N-1} & -y_{N-1} x'_{N-1} \\ 0 & 0 & 0 & x_{N-1} & y_{N-1} x & 1 & -x_{N-1} y'_{N-1} & -y_{N-1} y'_{N-1} \end{pmatrix} \begin{pmatrix} m_0 \\ m_1 \\ m_2 \\ m_3 \\ m_4 \\ m_5 \\ m_6 \\ m_7 \end{pmatrix} = \quad (4)$$

$$\begin{pmatrix} x'_0 \\ y'_0 \\ \vdots \\ x'_{N-1} \\ y'_{N-1} \end{pmatrix}$$

wherein the over-determined linear system is represented as $A_{2N \times 8} m_{8 \times 1} = b_{2N \times 1}$, which is equivalent to $A^T A m = A^T b$.

19. The system of claim 16, wherein the means for calculating calculates the histogram of the global motion parameters $\{m_j\}_{j=1:J}$ with four bins in each of eight dimensions, the means for choosing chooses the bin from the four bins that includes a largest amount of $m_j$, and the means for averaging averages over the $m_j$ of the chosen bin to obtain the final estimate.

* * * * *

UNITED STATES PATENT AND TRADEMARK OFFICE
CERTIFICATE OF CORRECTION

| | | |
|---|---|---|
| PATENT NO. | : 7,684,628 B2 | Page 1 of 1 |
| APPLICATION NO. | : 10/916599 | |
| DATED | : March 23, 2010 | |
| INVENTOR(S) | : Su et al. | |

It is certified that error appears in the above-identified patent and that said Letters Patent is hereby corrected as shown below:

<u>Title page,</u>
Item (73) Assignee, "Industrial Technology Research Institute, Hsinchu (TW)" should read
--Industrial Technology Research Institute, Hsinchu (TW); University of Washington, Seattle, WA (US)--.

Signed and Sealed this
Tenth Day of January, 2012

David J. Kappos
*Director of the United States Patent and Trademark Office*